United States Patent
Esch (10) Patent No.: US 9,651,284 B2
(45) Date of Patent: May 16, 2017

(54) SERVICE DEVICE FOR VEHICLE AIR CONDITIONING SYSTEMS, AND METHOD FOR OPERATING SAME, IN PARTICULAR FOR THE SELF-CLEANING TYPE

(75) Inventor: Franz-Josef Esch, Horstel (DE)

(73) Assignee: Dometic Sweden AB, Solna (SE)

( * ) Notice: Subject to any disclaimer, the term of this patent is extended or adjusted under 35 U.S.C. 154(b) by 155 days.

(21) Appl. No.: 14/000,664

(22) PCT Filed: Feb. 21, 2012

(86) PCT No.: PCT/EP2012/000753
§ 371 (c)(1),
(2), (4) Date: Oct. 24, 2013

(87) PCT Pub. No.: WO2012/113538
PCT Pub. Date: Aug. 30, 2012

(65) Prior Publication Data
US 2014/0033742 A1    Feb. 6, 2014

(30) Foreign Application Priority Data

Feb. 21, 2011  (DE) .................... 20 2011 002 986 U (51) Int. Cl.
*F25B 45/00*      (2006.01)
*B60H 1/00*       (2006.01)
(52) U.S. Cl.
CPC ......... *F25B 45/00* (2013.01); *B60H 1/00585* (2013.01); *F25B 2345/001* (2013.01); *F25B 2345/002* (2013.01); *F25B 2345/004* (2013.01)
(58) Field of Classification Search
CPC ................ F25B 45/00; F25B 2345/001; F25B 2345/002; F25B 2345/004; B60H 1/00585
See application file for complete search history.

(56) References Cited

U.S. PATENT DOCUMENTS 2,601,904 A   7/1952 Erwin
4,538,964 A   9/1985 Brown
(Continued)

FOREIGN PATENT DOCUMENTS

DE        4319051      12/1994
DE     202008003123     7/2009
(Continued)

OTHER PUBLICATIONS

European Patent Office, International Search Report and Written Opinion for PCT/EP2012/000753 dated Aug. 29, 2013, pp. 1-4, Munchen, Germany.
(Continued)

*Primary Examiner* — Ryan J Walters
*Assistant Examiner* — Christopher R Zerphey
(74) *Attorney, Agent, or Firm* — Middleton Reutlinger; James E. Cole (57) ABSTRACT

A servicing device and method for operating a servicing device for vehicle air-conditioning systems in particular for the self-cleaning thereof, the servicing device is equipped with an emptying device and a filling device for the drawing off of the refrigerant/compressor oil mixture from the refrigerant circuit system of a vehicle air-conditioning system and for the refilling of the vehicle air-conditioning system with refrigerant and compressor oil. A vacuum pump is used for the residual emptying of the refrigerant circuit system of the vehicle air-conditioning system and/or of the servicing device. An at least partially evacuated flushing agent tank is connected directly or indirectly via a connecting line with at least one of the high pressure servicing connection connectors of the servicing device and/or the subsequent pressure hoses and/or the switchover valve block and that a fluidic further connection takes place to the refrigerant reservoir which is under increased refrigerant pressure.

26 Claims, 3 Drawing Sheets

(56) References Cited

U.S. PATENT DOCUMENTS

| | | | |
|---|---|---|---|
| 4,998,413 A | 3/1991 | Sato et al. | |
| 5,024,061 A | 6/1991 | Pfeil, Jr. et al. | |
| 5,172,562 A | 12/1992 | Manz et al. | |
| 5,353,603 A | 10/1994 | Outlaw et al. | |
| 5,371,019 A | 12/1994 | Manz et al. | |
| 5,471,848 A * | 12/1995 | Major et al. | 62/149 |
| 5,517,825 A * | 5/1996 | Manz et al. | 62/158 |
| 5,535,596 A | 7/1996 | Todack | |
| 5,582,023 A | 12/1996 | O'Neal | |
| 6,314,749 B1 | 11/2001 | Van Steenburgh, Jr. | |
| 6,408,637 B1 | 6/2002 | Hanson et al. | |
| 6,779,350 B2 | 8/2004 | Ramachandran et al. | |
| 8,079,226 B2 | 12/2011 | Brown et al. | |
| 8,272,228 B2 | 9/2012 | Murray et al. | |
| 2006/0130510 A1 | 6/2006 | Murray et al. | |
| 2007/0113575 A1 | 5/2007 | Borre et al. | |
| 2008/0276634 A1 | 11/2008 | Brown et al. | |
| 2009/0188263 A1* | 7/2009 | Murray et al. | 62/77 |
| 2009/0241560 A1 | 10/2009 | Murray et al. | |
| 2012/0247131 A1 | 10/2012 | Esch | |
| 2013/0032220 A1* | 2/2013 | Cording | 137/15.04 |
| 2013/0205811 A1 | 8/2013 | Esch | |
| 2014/0223928 A1 | 8/2014 | Esch | |

FOREIGN PATENT DOCUMENTS

| | | |
|---|---|---|
| DE | 202008003122 | 9/2009 |
| DE | 102009054436 | 5/2011 |
| DE | 102010049615 | 5/2011 |
| WO | 8912792 | 12/1989 |
| WO | 2007085480 | 8/2007 |
| WO | 2011066833 | 6/2011 |
| WO | 2011088831 | 7/2011 |

OTHER PUBLICATIONS

Transmittal Letter of Related Cases Nov. 9, 2016.
European Patent Office, International Search Report and Written Opinion for PCT/EP2010/007155,. pp. 1-7, Munchen, Germany Jun. 7, 2012.
European Patent Office, International Search Report and Written Opinion for PCT/EP2011/004621, pp. 1-7, Munchen, Germany Mar. 28, 2013.
European Patent Office, International Search Report and Written Opinion for PCT/EP2012/002197, pp. 1-6, Rijswijk, Netherlands Dec. 5, 2013.

* cited by examiner

Fig. 1

Prior Art

Fig. 2

Fig. 3

SERVICE DEVICE FOR VEHICLE AIR CONDITIONING SYSTEMS, AND METHOD FOR OPERATING SAME, IN PARTICULAR FOR THE SELF-CLEANING TYPE

FIELD OF THE INVENTION

The invention relates to a servicing device for vehicle air-conditioning systems and a method for the operating thereof, in particular for its self-cleaning. Accordingly, a servicing device is provided for vehicle air-conditioning systems with an emptying and a filling device for drawing off the refrigerant/compressor oil mixture from the refrigerant circuit system of a vehicle air-conditioning system and for refilling the vehicle air-conditioning system with refrigerant and compressor oil. The servicing device can have at least one separator and one refrigerant compressor and generally comprises a refrigerant weighing device, which as a whole form a separation stage. A vacuum pump serves for the residual emptying of the refrigerant circuit system of the vehicle air-conditioning system. At least one pressure- and/or time-controlled switchover valve block serves for the selective direct fluidic connecting through of the refrigerant circuit system of the vehicle air-conditioning system with the separation stage or with a refilling system for refilling the vehicle air-conditioning system with refrigerant/compressor oil mixture and, if applicable, additive.

TECHNOLOGICAL BACKGROUND

Servicing devices for vehicle air-conditioning systems serve inter alia to empty from time to time within a maintenance operation the refrigerant circuit of the most varied of vehicle air-conditioning systems and to introduce a new fill of refrigerant. It is necessary here to comply with precise quantities and refrigerant specifications. In addition, in many cases lubricating oil for the compressor of the refrigerant circuit must be removed from the vehicle air-conditioning system and replenished again. This also takes place in quantities and specifications dependent on the type of vehicle or respectively type of air-conditioning device. Some vehicle air-conditioning systems also require an additive for the refrigerant circuit, which during a maintenance service is likewise partially replaced. Usually, the compressor oil arrives into the refrigerant circuit and is therefore also pumped around during the operation of the air-conditioning systems. Only quite specific pairings of refrigerant and compressor oil are compatible with one another for this purpose. In order to be able to recover at least a portion of the refrigerant for re-use after the drawing off of the refrigerant/compressor oil mixture, service devices for vehicle air-conditioning systems usually also have a separator by which refrigerant can be separated from the refrigerant/compressor oil mixture for re-use. Used compressor oil and, if applicable, used additive, is/are generally collected by the servicing device in order generally to be subsequently discarded.

Figure 1:
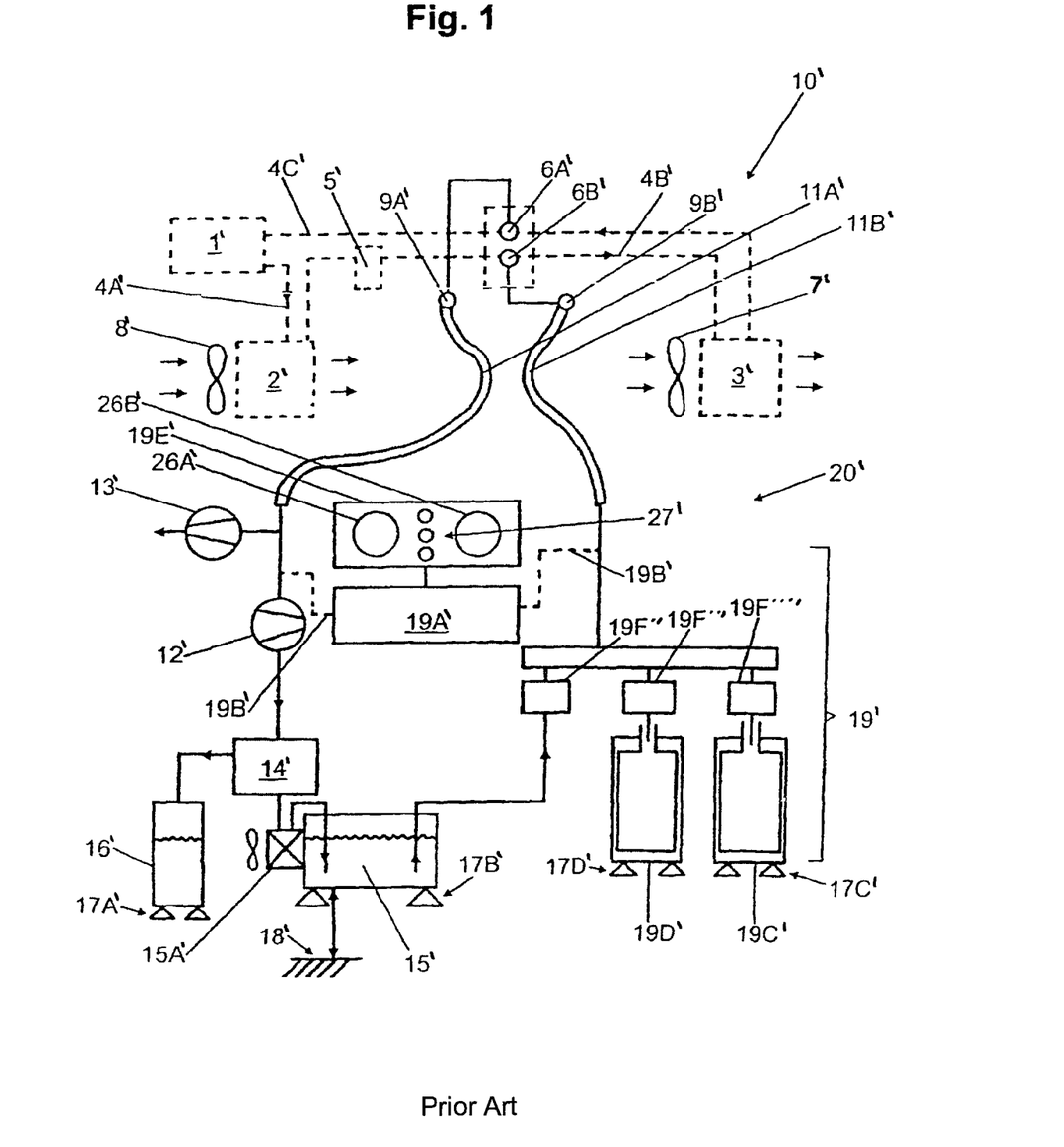

As illustrated in applicant's WO 2007/0845480, there is a servicing device for vehicle air-conditioning systems that is known according to the block diagram and FIG. 1. The patent application shows in a continuous line the essential components of the generic servicing device for a vehicle air-conditioning system and, in dashed lines, a vehicle air-conditioning system which is to be serviced. The latter consists of compressor 1' which is lubricated by oil, a condenser 2', a vaporizer 3' and, between these components, pipelines 4A'-4C' producing a closed coolant system. In addition, a dryer 5' is provided, which can also serve as a collector or reservoir for refrigerant. Finally, two servicing connections 6A'/6B' are installed into the refrigerant circuit for the fluid exchange. The cold which is available at the vaporizer 3' is discharged by a cold air blower 7' and supplied to the interior of the vehicle. The condensation heat of the condenser 2' is transported away by a warm air blower 8'. Servicing connection connectors 9A' and 9B' of a servicing device 20' permit, in the case of servicing, refrigerant/compressor oil mixture to be extracted or respectively filled at the servicing connections 6A', 6B'. The vehicle air-conditioning system, numbered as a whole by 10' differs from vehicle type to vehicle type and is not the subject matter of the present invention.

A servicing device designated as a whole by 20' for a vehicle air-conditioning system has flexible pressure hoses 11A', 11B' for connecting the servicing device 20' with the vehicle air-conditioning system 10' via the servicing connection connectors 9A', 9B' at the servicing connections 6A', 6B'. A suction pump 12', constructed as a refrigerant compressor, conveys used refrigerant/compressor oil mixture via the pressure hoses 11A' and 11B' and a separator 14'. The latter separates refrigerant from the drawn-off mixture by vaporization and feeds this to a refrigerant reservoir 15' which is constructed as a pressure container. Compressor oil/additive mixture which is precipitated in the separator 14' is collected in an exchangeable used oil container 16' and its weight is determined by means of weighing device 17A'. An air-cooled refrigerant condenser 15A' is securely connected with the refrigerant reservoir 15'. Thereby, refrigerant which is fed back is fed predominantly in liquid form to the refrigerant reservoir 15'. The entire refrigerant reservoir together with condenser rests on a further weighing device 17B' for detecting the refrigerant which is fed in and discharged and also that which is in store. After the drawing off of the used mixture, a vacuum pump 13' provides for the negative pressure necessary for the refilling in the circuit of the vehicle air-conditioning system and discharges the drawn-off gas volume e.g. to the atmosphere.

A refilling system designated as a whole by 19' consists substantially of exchangeable storage containers 19D' for compressor oil and 19C' for additives, a control unit 19A' with valve block and control lines 19B', a remote display 19E' and metering- and valve units 19F" to 19F"". The storage containers 19C' and 19D' are preferably able to be weighed. Further weighing devices 17C', 17D' serve for this.

As illustrated in DE 20 2008 003 123 U1, there is a further servicing device for vehicle air-conditioning systems of the applicant that is known, in which the refillability of the previously evacuated vehicle air-conditioning system is improved by a heat source provided in the refrigerant storage container to increase the pressure of the refrigerant. A comparable servicing device for vehicle air-conditioning systems is known from US 2009/0158756A1.

In a further generic service device for vehicle air-conditioning systems of the applicant, it is known from the still unpublished DE 10 2009 054 446, applied for on 25 Nov. 2009, in a first servicing phase to draw off a circuit mixture of refrigerant, compressor oil and, if applicable, further mixture components, from a vehicle air-conditioning system into a separator stage by means of a refrigerant compressor via a separator and, in so doing, to separate refrigerant by means of the separator from the drawn-off circuit mixture, to compress it and collect it and to determine its quantity. In a second servicing phase, the refrigerant circuit system of the vehicle air-conditioning system is largely residually emptied by means of a vacuum pump. Residual gases which are pumped out in the second servicing phase are directed by means of the refrigerant compressor through the separator stage and the quantity of the refrigerant residue which is collected thereby is determined. Through this step, inter alia the diagnosis of the status of the vehicle air-conditioning system is improved. Residual gases arrive if necessary in purified form into the atmosphere.

SUMMARY OF THE INVENTION

Proceeding therefrom, the invention is based on the problem of improving a servicing device for vehicle air-conditioning systems for a plurality of different refrigerant/compressor oil mixtures. The invention proceeds from the knowledge that a range of recent refrigerants and/or compressor oils react in an extraordinarily sensitive manner to mixing with different compressor oils and/or refrigerants which can still be situated as residues in the air-conditioning servicing device from a preceding servicing activity. It was thus found e.g. that compressor oils for so-called hybrid vehicles can already lose important characteristics, such as an extremely low electrical conductivity, with a few percent admixture of other compressor oils. In hybrid vehicles preferably electrically operated compressors are namely used for the vehicle air-conditioning systems instead of compressors which are driven mechanically by the drive motor, wherein the electrical operating voltage of such compressors is comparatively high. One has therefore changed over to using compressor oils which are electrically particularly less conductive, such as ester oil, for such compressors, whilst conventional refrigerant compressors for vehicle air-conditioning systems are lubricated e.g. with so-called PAG oil. Efforts to also improve existing air-conditioning servicing devices by various types of flushing steps such that on its exchange the refrigerant/compressor oil mixture is not damaged by impurities or residues in the servicing device from the processing of other compressor oils, have not led to any satisfactory result.

To solve the problem forming the basis of the invention a generic servicing device for vehicle air-conditioning systems having an evacuatable flushing agent tank is to be provided, which is connected via a connecting line with at least one of the high pressure and/or low pressure servicing connection connectors of the servicing device and/or the subsequent pressure hoses and/or the switchover valve block. For the purpose of connection to the vehicle air-conditioning system therefore at least one of the conventional pressure hoses of the air-conditioning servicing device and a switchover valve block adjoins the servicing connection connector. Following this is a fluidic connection to the refrigerant reservoir, which is under increased refrigerant pressure and which, like the flushing agent tank, if desired, can also be arranged outside the servicing device. It was found that the fluidic direct connection on the previously described path between the flushing agent tank, which is under negative pressure, and the refrigerant reservoir, which is under increased refrigerant pressure, leads to refrigerant overflowing from the refrigerant reservoir at comparatively great speed into the flushing agent tank and thereby the fluidically connected components or assemblies between refrigerant reservoir and flushing agent tank in a short time are freed sufficiently thoroughly of residues of the last used refrigerant/compressor oil mixture, in order to improve the servicing device therefore for a contamination-free or low-contamination use with a different refrigerant/compressor oil mixture. The refrigerant collected in the flushing agent tank can, if applicable after a subsequent cleaning, be used again as refrigerant.

According to a preferred embodiment of the invention, provision can be made to inject into the line system of the servicing device a quantity of the compressor oil which is required for the subsequent servicing case. The quantity can be relatively small and be e.g. 1 to 100 ml. It can be drawn in via the vacuum in the flushing agent tank. Thereby also the connecting line to the dispenser is flushed. Hence, the compressor oil from the previous servicing case can be expelled even better. For this, it is expedient to firstly insert/exchange in the refilling system of the servicing device the dispenser containing the compressor oil against a dispenser containing the compressor oil for the following servicing case. Generally one single compressor oil injection is sufficient for each self-cleaning case.

After each flushing—also after each repeat flushing—of the servicing device with refrigerant and if applicable with compressor oil, the flushing agent tank can be advantageously emptied, in particular by the vacuum pump of the servicing device, such that drawn-in refrigerant/compressor oil mixture is fed via the vacuum pump to a refrigerant/compressor oil separator of the servicing device.

The above-mentioned components and the claimed components and components described in the example embodiments, to be used according to the invention, are not subject to any particular exceptions in their size, shape, choice of material and technical design, so that the selection criteria which are known in the field of application can be applied without restriction.

In summary, there is provided a servicing device for vehicle air-conditioning systems with an emptying and a filling device for the drawing off of the refrigerant/compressor oil mixture from the refrigerant circuit system of a vehicle air-conditioning system and for the refilling of the vehicle air-conditioning system with refrigerant and compressor oil with a vacuum pump for the residual emptying of the refrigerant circuit system and/or of the servicing device, with a refilling system for refilling the vehicle air-conditioning system with refrigerant, compressor oil and, if applicable, additive, with a refrigerant reservoir under increased refrigerant pressure, with pressure hoses provided with servicing connection connectors of the servicing device to a vehicle air-conditioning system which is to be serviced and with connecting lines known per se, and, if applicable, comprising a separator stage comprising at least one separator and a refrigerant compressor, and if desired also a refrigerant weighing device, wherein the servicing device can be provided with at least one pressure-controlled and/or time-controlled switchover valve block for the selective direct fluidic connecting through of the refrigerant circuit system of the vehicle air-conditioning system with the separator stage. There is included an evacuatable flushing agent tank, which is able to be brought into fluidic flow connection via at least one connecting line with at least one of the servicing connection connectors of the servicing device and the associated pressure hose and via the switchover valve block, which is present if applicable, with the refrigerant reservoir which is under increased refrigerant pressure. The flushing agent tank can be provided with two fluid passages serving as connecting lines, with which the servicing connection connectors are connected or able to be connected between two cases of servicing. The connecting lines can be designed to be closed by shutoff valves. The connecting lines or the shutoff valves can be configured as parking connectors for the servicing connection connectors.

The flushing agent tank can serve as a coupler between the servicing connection connectors. There is also provided a method for operating a servicing device for vehicle air-conditioning systems in particular for the self-cleaning thereof, wherein the servicing device is configured with an emptying device and a filling device for the drawing off of the refrigerant/compressor oil mixture from the refrigerant circuit system of a vehicle air-conditioning system and for the refilling of the vehicle air-conditioning system with refrigerant and compressor oil, in which a vacuum pump is used for the residual emptying of the refrigerant circuit system of the vehicle air-conditioning system and/or of the servicing device and in which the vehicle air-conditioning system is refilled with refrigerant, compressor oil and, if applicable, additive by a refilling system with a refrigerant reservoir which is under increased refrigerant pressure. The method includes the step of using an evacuated or at least partially evacuated flushing agent tank that is connected directly or indirectly via a connecting line with at least one of the high pressure servicing connection connectors of the servicing device and/or the subsequent pressure hoses and/or the switchover valve block and that a fluidic further connection to the refrigerant reservoir, which is under increased refrigerant pressure, takes place so that refrigerant shoots or flows out from the refrigerant reservoir into the flushing agent tank and fluid lines and/or ducts encumbered by the refrigerant/compressor oil mixture of the preceding case of servicing are totally or partially flushed free. The method can include quantity of the compressor oil which is required for the subsequent case of servicing is injected into the line system of the servicing device. The method can include the step that after a flushing of the servicing device with refrigerant and, if applicable, with compressor oil, the flushing agent tank is emptied such that the refrigerant/compressor oil mixture which is previously drawn into it is fed by vacuum pump to a refrigerant/compressor oil separator of the servicing device.

Further details, features and advantages of the subject matter of the invention will emerge from the subclaims and from the following description and the associated drawings, in which—by way of example—an example embodiment of a servicing device for vehicle air-conditioning systems is illustrated. Also, individual features of the claims or of the embodiments can be combined with other features of other claims and embodiments.

DETAILED DESCRIPTION OF EXAMPLE EMBODIMENTS

Figure 2:
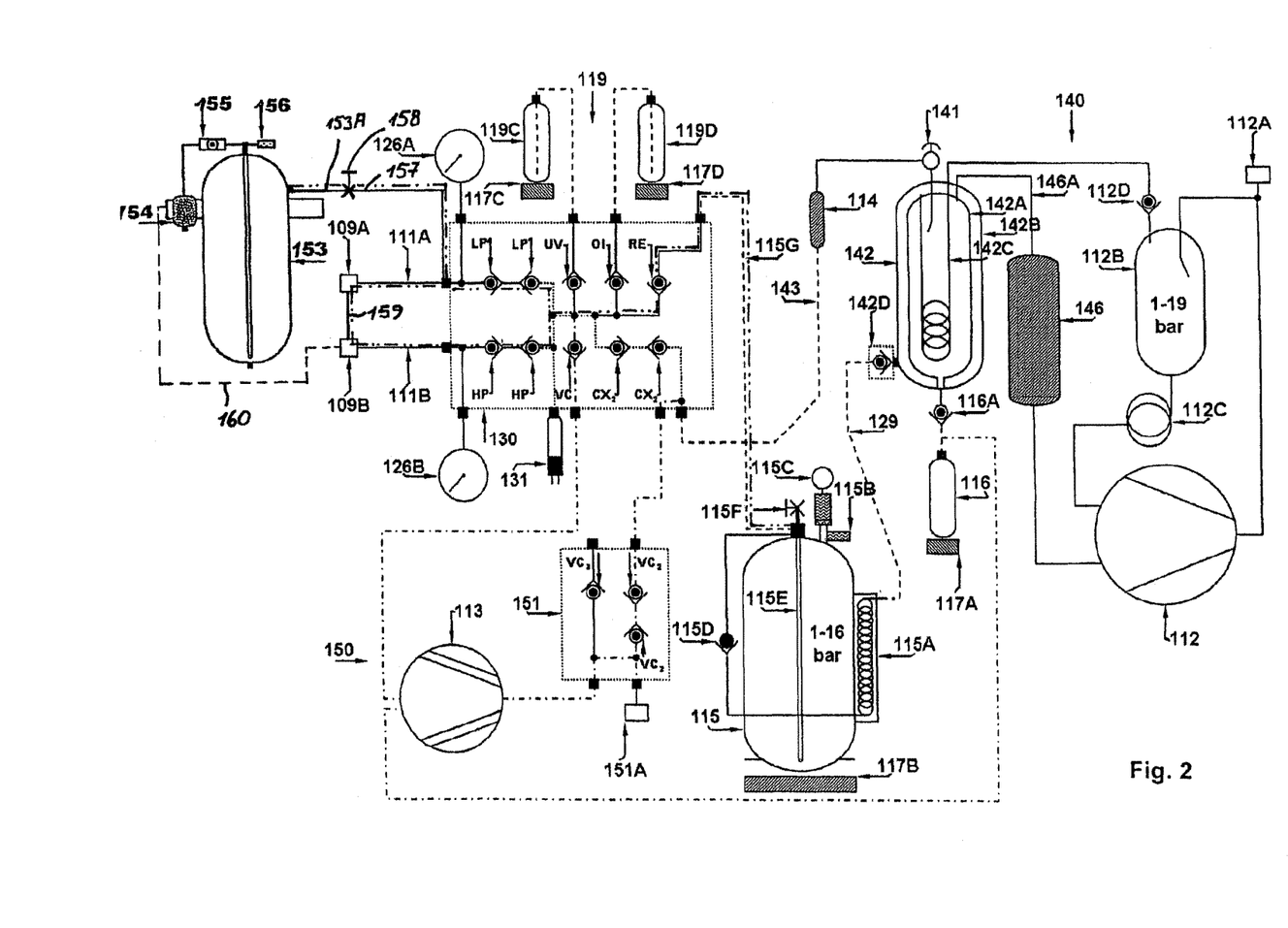

The basic structure of a generic servicing device for vehicle air-conditioning systems can be seen from the block diagram according to FIG. 2, wherein, however, not all of the illustrated components are a compulsory constituent element of the present invention. Accordingly, service connection connectors 109A, 109B for connection to the coolant/compression circuit of a vehicle air-conditioning system (not illustrated here) are provided, in order to service the latter, in particular to empty it and refill it. A fluidic connection to a first switchover valve block 130 exists via pressure hoses 111A, 111B, the function of which switchover valve block is explained further below. The switchover valve block 130 is fluidically connected on the one hand with a separator stage 140 illustrated on the right in the drawing, which is explained further below, and on the other hand (bottom left in the drawing) with a vacuum unit 150, which is likewise explained further below. A low pressure manometer 126A and a high pressure manometer 126B on the switchover valve block 130 serve inter alia for monitoring the status and function of the coolant-compressor oil circuit of the vehicle air-conditioning system. Furthermore, the switchover valve block 130 is fluidically connected to a refilling system 119 for compressor oil and additives, with weighing devices 117C and 117D for dispensers 119C, 119D, for example for a leak detection additive or respectively for fresh oil. The system pressure within the switchover valve block 130, which is significant after the start of emptying of the fluid circuit of a vehicle air-conditioning system (not illustrated in FIG. 2) for the system control, which is explained further below, is monitored via a pressure sensor 131 connected with a collecting line of the switchover valve block 130, so that the system pressure, in particular the refrigerant pressure of the vehicle air-conditioning system is monitored, so that inter alia the circuit systems, explained below, (separator stage 140 and vacuum unit 150 or respectively associated valve switching arrangements) can be controlled. Within the switchover valve block 130 the lines which are to be associated with the circuit of the separator stage 140 are illustrated by dots. In contrast, the lines to be associated with the vacuum unit 150 are illustrated in dot-and-dash lines, in order to be able to subsequently differentiate better the working phases of the system.

The mode of operation of the separator stage 140 is as follows: After connecting the servicing connection connectors 109A, 109B to the corresponding ports of the vehicle air-conditioning system and opening of the corresponding valves LP, HP, $CX_2$ of the switchover valve block 130, the system pressure of the vehicle air-conditioning system is available, in order to transfer a first part of the content of the refrigerant compressor oil circuit of the vehicle air-conditioning system into the separator stage 140. This system pressure is already approximately 3 bar absolute at 0° C. and at approximately 20° C. is already in the order of 3 bar absolute, so that the conveying of refrigerant-compressor oil mixture into the separator stage 140 initially even takes place automatically. Moreover, this conveying is assisted by operating the compressor 112, as explained further below and is still kept running later when the system pressure is falling. From the switchover valve block 130, the refrigerant compressor oil mixture arrives via a coarse filter 114 and a constant pressure valve 141, which is set to approximately 3.5 bar absolute, into a double-jacket heat exchanger 142, and namely in its inner container 142A.

There, the volatile components are vaporized and the gaseous phase arrives via a line 146A into a gas dryer 146 and from there into the compressor 112.

The double-jacket heat exchanger 142 serves simultaneously as a separator for liquid components of the refrigerant-compressor oil mixture, this concerns basically the compressor oil, contained additives if applicable and residual quantities of the refrigerant which are still bound in the compressor oil. This liquid phase is fed to a used oil container 116 via an oil discharge valve 116A. The quantities which occur can be registered by means of a weighing device 117A which also weighs the container.

The compressor 112 makes provision that the refrigerant is compressed at its outlet side to a pressure of up to e.g. 19 bar absolute. A compressor emergency shutoff valve 112A generally limits the pressure to 19 bar. As the lubricating oil of the compressor also arrives into the compressed refrigerant, the latter is separated in an oil separator 112B and is fed again via a capillary pipe 112C, which acts as a pressure throttle, to the lubrication of the compressor 112. The compressed, dried refrigerant, freed from compressor oil and additives arrives via a solenoid valve 112D into a heating coil 142C, which is situated in the gas space of the inner container 142A of the double-jacket heat exchanger 142. Hereby, the compression heat contained in the compressed refrigerant can be emitted in order to vaporize as far as possible on the cold side the freshly arriving refrigerant/ compressor oil mixture from the vehicle air-conditioning system. The cleaned (recycled) refrigerant arrives from the heating coil 142C initially into the outer jacket region (outer container 142B) of the double-jacket heat exchanger 142 and from there via a valve block 142D and a connecting hose 129 to the refrigerant reservoir 115 (storage container). The storage container is weighed together with contents by a weighing device 117B. The storage container also carries a refrigerant condenser 115A, which is advantageously also weighed and in which the refrigerant, which is under compression pressure, is condensed in order to arrive in liquid form into the refrigerant reservoir 115. Both the separator 112B and also the refrigerant reservoir 115 are configured as so-called pressure containers. The pressure in the refrigerant reservoir 115 is protected against excess pressure by means of a valve 115B, because the gaseous phase of non-condensable gases forming above the liquid level must be discharged in a controlled manner starting from a particular excess pressure of e.g. 16 bar, for safety reasons. This can also take place non-automatically by an operator by means of a handle 115C.

The liquid refrigerant arrives into the liquid region of the refrigerant reservoir 115 via a non-return valve 115D and a riser pipe 115E. In order to be able to refill the vehicle air-conditioning system with refrigerant, liquid refrigerant arrives back into the switchover valve block 130 via the riser pipe 115E, a valve 115F and a connecting line 115G.

As soon as the vehicle air-conditioning system is emptied to such an extent that the compressor 112 can no longer draw in refrigerant/compressor oil mixture sufficiently on its low pressure side, which can be the case e.g. at a pressure of 0.7 bar absolute, the vacuum unit 150 is set in operation by actuating the corresponding valves. Thus, further gas components are drawn in from the fluid circuit of the vehicle air-conditioning system via the collecting line of the switchover valve block 130 by the vacuum pump 113. From the outlet side of the vacuum pump 113, this gas or gas mixture arrives via a (second) switchover valve block 151 and solenoid valves VC2 back to the switchover valve block 130 and from there into the connecting line 143 which fluidically couples the switchover valve block 130 to the separator stage 140. The gas quantities conveyed by the vacuum pump 113 from the vehicle air-conditioning system are now treated in the separator stage 140, including weighing, just as the quantities of refrigerant/compressor oil mixture emerging independently from the vehicle air-conditioning system at the start of the emptying process. The difference from the first phase, designated here as the outflow phase, consists in that owing to the preceding outflow phase assisted by the compressor 112, no liquid components, i.e. substantially gaseous refrigerant or, if applicable, air are drawn in from the vehicle air-conditioning system. Here, firstly, relatively large quantities of gas are to be dealt with, whereas towards the end of the second phase, designated here as the evacuation phase, the gas quantities become distinctly less. With an inlet pressure of approximately 1 mbar or after a fixedly preset process time has elapsed, the evacuation process is terminated.

The gas pressure generated by the vacuum pump 113 on its outlet side should not exceed an order of magnitude of 2 bar absolute, so as not to damage the vacuum pump 113. For pressure control, a pressure switch 151A is associated with the switchover valve block 151 connected downstream of the vacuum pump, by means of which pressure switch the vacuum pump 113 switches off on exceeding of an output pressure of e.g. 2 bar, until the outlet pressure has dropped again accordingly, so that the vacuum pump 113 can be switched on again.

As the servicing device is used not only for the drawing off and refilling of the vehicle air-conditioning system in normal servicing operation, but also for repair cases on air-conditioning systems, e.g. replacement of components, the second switchover valve block 151 which is connected downstream of the vacuum pump 113 is equipped with an outlet valve $VC_3$, which can lead e.g. into the atmosphere.

If, therefore, only air is drawn off from the repaired vehicle air-conditioning system for subsequent refilling, this air does not arrive into the separator stage 140.

An evacuatable flushing agent tank 153 is fluidically connected via a connecting line 157, which is able to be closed off, and e.g. a shut-off valve 158, operated manually or able to be actuated automatically, in a first (illustrated) embodiment, close to the inlet side of the first switchover valve block 130 at the low pressure side. Between the two servicing connection connectors 109A and 109B a coupler 159, known per se, is inserted for the purpose a fluidic through-flow connection. The mode of operation is as follows:

As illustrated in the double-dot-dashed lines parallel to the lines, a direct flow connection can therefore be produced between the evacuatable flushing agent tank 153 and the refrigerant reservoir 115. For this purpose, the high pressure valves HP and/or the low pressure valves LP are switched to through-flow electrically, e.g. by a solenoid, whilst the low pressure valves LP or respectively the high pressure valves are closed without flow, if desired.

The flushing agent tank 153 can be brought to a desired negative pressure if applicable via a filter 154, an inspection glass 155 and/or a safety valve 165 and an evacuation line 160. For this, the first and the second switchover valve block 130 and 151 are connected through fluidically to the vacuum pump 113, whilst the shutoff valve 158 can be closed. By subsequent opening of the valves 115F at the outlet of the refrigerant reservoir 115, opening of the high pressure valves HP in the switchover valve block 130 and opening of the valve 158 in the connecting line 157 refrigerant gas or gas-liquid mixture then flows at high speed through the contamination-sensitive connecting paths of the switchover valve block 130 and the pressure hoses 111A, 111B including through the servicing connection connectors 109A, 109B and clean these of residues of the compressor oil/ additive mixture from the preceding servicing operation. Such flushing processes can be repeated several times in order to obtain an even better cleaning result.

It is also possible to connect the connecting line 157 with the shutoff valve 158 directly to the high pressure servicing connection connector 109B and/or to the low pressure servicing connection connector, when the drawing off of the refrigerant compressor oil mixture from the vehicle air-conditioning system is to take place solely via one or both of the connections. The coupler 159 is then therefore compulsory. If desired, however, it is also possible to flush in parallel or in succession not only the high pressure valves HP but also the low pressure valves LP of the switchover valve block in a comparable manner, in order to also clean these regions, in so far as this is important for the refilling of the vehicle air-conditioning system. After a completed flushing step, the shutoff valve 158 is closed and the coupler 159, in so far as it is used, is removed.

Figure 3:
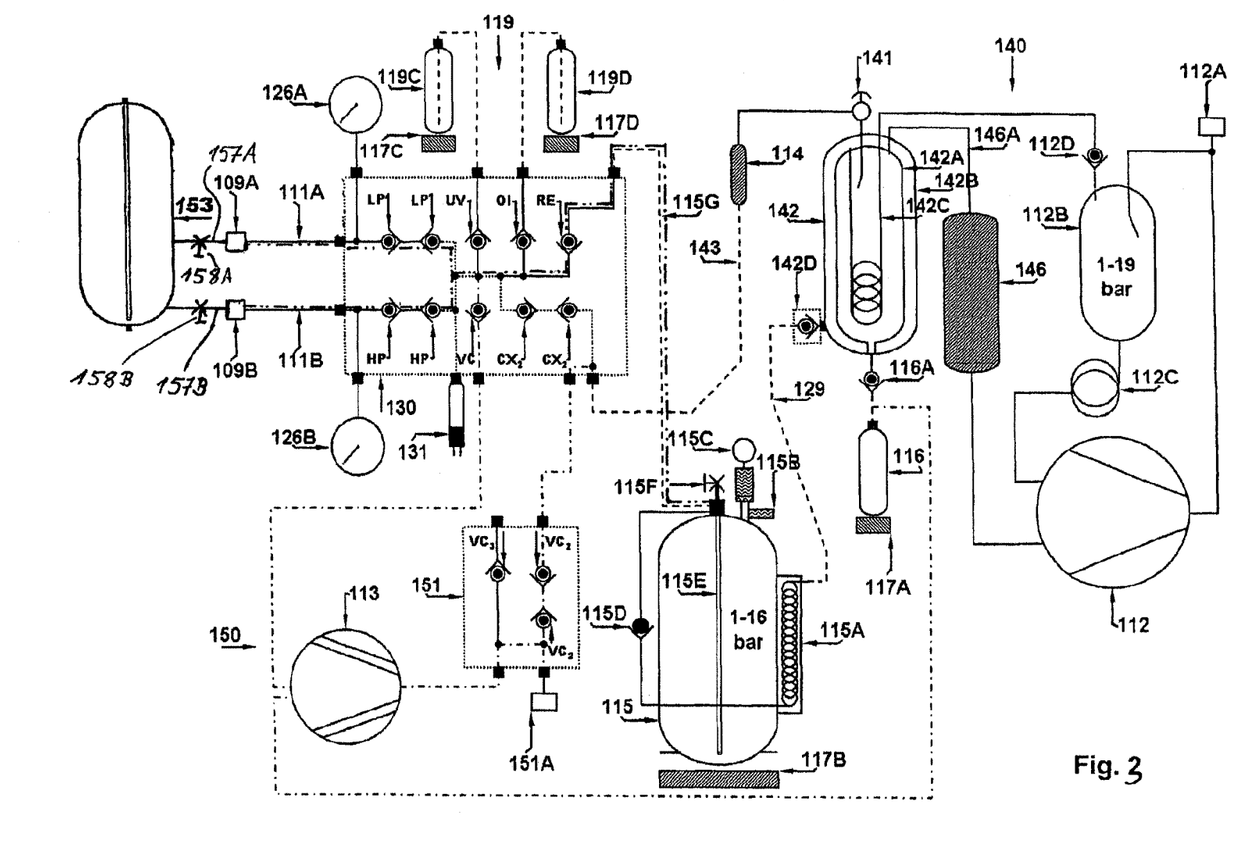

The embodiment according to FIG. 3 has proved to be particularly advantageous and e.g. also able to be subsequently fitted in a simple manner. This, differing from FIG. 2, in a servicing device with the otherwise identical structure as according to FIG. 2, makes provision to provide a flushing agent tank 153 with two fluid passages serving as connecting lines 157A, 157B, which can be able to be closed by shutoff valves 158A, 158B, e.g. by hand. The shutoff valves 158A, 158B can be provided with so-called "parking connectors" by which the servicing connection connectors 109A, 109B between two cases of servicing, i.e. when not in use, are connected. In contrast to the conventional use, in accordance with FIG. 3 the shutoff valves 158A, 158B are connected, however, in a fluidically conducting sealing manner with the servicing connection connectors 109A, 109B. Then the flushing agent tank 153 serves simultaneously as the coupler described above (coupler 159).—Also, this embodiment permits the mode of operation described by FIG. 2.

Both alternatives permit the further modes of operation described in the introductory part, to which according to the (self-)cleaning of the servicing device for vehicle air-conditioning systems it is thereby facilitated that a quantity of compressor oil, which is needed for the next case of servicing, is to be injected into the line system of the servicing device and thereby to better expel the compressor oil from the previous case of servicing. For this, it is expedient firstly in the refilling system 119 to insert/exchange the dispenser (119C or 119D) containing compressor oil against a dispenser containing the compressor oil for the following case of servicing. These dispensers are in any case preferably designed as exchangeable dispensers.

LIST OF REFERENCE NUMBERS

1' compressor
2' vaporizer
3' condenser
4A'-C' pipelines
5' precipitator
6A'/B' servicing connections
7' cold air blower
8' warm air blower
9A'/B' servicing connection connector
10' vehicle air-conditioning system
11A'/B' pressure hoses
12' suction pump
13' vacuum pump
14' separator
15' refrigerant reservoir
15A' refrigerant condenser
16' used oil container
17A'-J' weighing devices
18' relieving device
19' refilling system
19A' control unit with valve block
19B' control lines
19C' storage container
19D' storage container
19E' remote display
19F'' metering and valve unit
19F''' metering and valve unit
19F'''' metering and valve unit
20' servicing device
26A' low pressure manometer
26B' high pressure manometer
119 refilling system
109A servicing connection connector
109B servicing connection connector
111A pressure hoses
111B pressure hoses
112 compressor
112A compressor emergency shutoff valve
112B oil separator
112C capillary pipe
112D solenoid valve
113 vacuum pump
114 coarse filter
115 refrigerant reservoir
115A refrigerant condenser
115B valve
115C handle
115D non-return valve
115E riser pipe
115F valve
115G connecting line
116 used oil container
116A oil discharge valve
117A weighing device
117B weighing device
117C weighing device
117D weighing device
119 refilling system
119C dispenser
119D dispenser
126A low pressure manometer
126B high pressure manometer
129 connecting hose
130 first switchover valve block
131 pressure sensor
140 separator stage
141 constant pressure valve
142 double-jacket heat exchanger
142A inner container
142B outer container
142C heating coil
142D valve block
143 connecting line
146 gas dryer
146A line
150 vacuum unit
151 second switchover valve block
151A pressure switch
153 flushing agent tank
154 filter
155 inspection glass
156 safety valve
157 connecting line
158 shut-off valve
159 coupler
160 evacuation line

The invention claimed is:

1. A servicing device for use with vehicle air-conditioning systems to empty a refrigerant/compressor oil mixture from a refrigerant circuit system of a vehicle air-conditioning system and to fill the vehicle air-conditioning system, said servicing device comprising:
a vacuum pump for residual emptying the refrigerant circuit system, the servicing device, or combinations thereof of said refrigerant/compressor oil mixture,
a refilling system for refilling the vehicle air-conditioning system with at least two components selected from the group consisting of refrigerant, compressor oil and additive, a refrigerant reservoir that is configured to be under refrigerant pressure, pressure hoses provided with servicing connection connectors configured to connect to the vehicle air-conditioning system being serviced, a separator stage comprising at least one separator, a refrigerant compressor, and a refrigerant weighing device;

at least one pressure or time controlled switchover valve block configured to selectively control a fluidic connection between the refrigerant circuit system of the vehicle air-conditioning system and the separator stage, said at least one pressure or time controlled switchover valve block being disposed in said servicing device and in fluid connection with the separator stage, with one pressure side of said vacuum pump and with a second pressure side of said vacuum pump;

wherein the at least one switchover valve block includes a plurality of valves in a first configuration fluidly connecting the vehicle air-conditioning system to the separator during the emptying of the refrigerant/compressor oil mixture from the refrigerant circuit system of the vehicle air-conditioning system;

wherein the at least one switchover valve block includes said plurality of valves in a second configuration fluidly connecting a flushing agent tank to the refrigerant reservoir, the vacuum pump or combinations thereof to cause the at least one switchover valve block to be flushed out and cleaned of residual refrigerant/compressor oil mixture from the refrigerant circuit system that resides in the at least one switchover valve block;

wherein the at least one switchover valve block includes said plurality of valves in a third configuration fluidly connecting the refrigerant reservoir to the refrigerant circuit system of the vehicle air-conditioning system to fill the refrigerant circuit system with the refrigerant; and, said flushing agent tank that is configured to be brought into fluidic flow connection with at least one of the servicing connection connectors via the at least one switchover valve block to enable said at least one switchover valve to be flushed with fluid, said flushing agent tank also configured to be brought into fluidic flow communication with the refrigerant reservoir via the at least one switchover valve block.

2. The servicing device according to claim 1, characterized in that the flushing agent tank serves as a coupler between the servicing connection connectors.

3. The servicing device according to claim 1, characterized in that the flushing agent tank is provided with two fluid passages to enable the flushing agent tank to be used during the emptying of the refrigerant circuit system of the vehicle air-conditioning system and the filling of the refrigerant circuit system of the vehicle air-conditioning system.

4. The servicing device according to claim 3, characterized in that the flow of fluid to the flushing agent tank is controlled by shutoff valves.

5. The servicing device according to claim 4, characterized in that the flushing agent tank serves as a coupler between the servicing connection connectors.

6. The servicing device according to claim 3, characterized in that the flushing agent tank serves as a coupler between the servicing connection connectors.

7. The servicing device according to claim 1, characterized in that the flushing agent tank serves as a coupler between the servicing connection connectors.

8. The servicing device of claim 1 wherein said at least one switchover valve block comprises a first valve block and a second valve block.

9. A method for operating a servicing device for vehicle air-conditioning systems in particular for the self-cleaning thereof, wherein the servicing device is configured with an emptying device and a filling device for the drawing off of a refrigerant/compressor oil mixture from the refrigerant circuit system of a vehicle air-conditioning system and for the refilling of the vehicle air-conditioning system, said method comprising:

residual emptying of the refrigerant circuit system of the vehicle air-conditioning system and/or of the servicing device with a vacuum pump;

refilling the vehicle air-conditioning system, using a refilling system, with at least one of said components selected from the group consisting of refrigerant and compressor oil, the refilling system including a refrigerant reservoir which is under refrigerant pressure;

connecting directly or indirectly via a connecting line with at least one high pressure servicing connection connector of the service device, an evacuated or at least partially evacuated flushing agent tank and at least one switchover valve block disposed within said servicing device and in fluid connection with a separator stage, with one pressure side of said vacuum pump and with a second pressure side of said vacuum pump, wherein said at least one switchover valve block includes a plurality of valves having: a first configuration for said residual emptying, a second configuration for flushing and a third configuration for said refilling with the refrigerant; and, causing the refrigerant to flow out from the refrigerant reservoir into the flushing agent tank during said flushing and thereby at least partially flushing the refrigerant/compressor oil mixture from the at least one switchover valve block.

10. The method according to claim 9, further comprising injecting a quantity of the compressor oil which is required for the servicing of the vehicle air-conditioning system into the at least one switchover valve block of the servicing device.

11. The method according to claim 10, characterized in that after a step of flushing of the servicing device, emptying the flushing agent tank such that said refrigerant/compressor oil mixture which was previously drawn into the flushing agent tank is fed by the vacuum pump to the separator stage.

12. The method according to claim 9, characterized in that after a step of flushing of the servicing device, emptying the flushing agent tank such that said refrigerant/compressor oil mixture which was previously drawn into the flushing agent tank is fed by the vacuum pump to the separator stage.

13. A servicing device for use with vehicle air-conditioning systems to empty a refrigerant/compressor oil mixture from a refrigerant circuit system of a vehicle air-conditioning system and to fill the vehicle air-conditioning system with refrigerant, said servicing device comprising:

at least one switchover valve block within said servicing device and having a plurality of valves, said at least one switchover valve block configured to control fluid flow through the service device, said at least one switchover valve block in fluid communication with a separator stage, one side of a vacuum pump and a second side of said vacuum pump;

a refrigerant compressor configured to compress refrigerant received from the refrigerant circuit system during the emptying of the refrigerant circuit system;

the separator stage comprising a separator configured to separate compressor oil from the refrigerant prior to the refrigerant flowing to the refrigerant compressor;

said vacuum pump configured to create a vacuum to withdraw residual refrigerant/compressor oil mixture from the refrigerant circuit system, the at least one switchover valve block, or combinations thereof;

a refilling system for refilling the refrigerant circuit system with at least one component selected from the group consisting of refrigerant, compressor oil and additive, said refilling system including a refrigerant reservoir that is configured to contain pressurized refrigerant, the refrigerant reservoir is fluidly connected to the at least one switchover valve block;

a flushing agent tank fluidly connected to the at least one switchover valve block;

pressure hoses provided with servicing connection connectors configured to connect to the refrigerant circuit system, the pressure hoses fluidly connected to the at least one switchover valve block to enable fluid to flow between the at least one switchover valve block and the refrigerant circuit system;

wherein said plurality of valves of the at least one switchover valve block includes a first configuration of said plurality of valves to fluidly connect the vehicle air-conditioning system to the separator during the emptying of the refrigerant/compressor oil mixture from the refrigerant circuit system of the vehicle air-conditioning system;

wherein said plurality of valves of the at least one switchover valve block includes a second configuration of said plurality of valves to fluidly connect the flushing agent tank to the refrigerant reservoir, the vacuum pump or combinations thereof to cause the at least one switchover valve block to be flushed out and cleaned of residual refrigerant/compressor oil mixture from the refrigerant circuit system that resides in the at least one switchover valve block; and wherein the at least one switchover valve block includes a third configuration of said plurality of valves to fluidly connect the refrigerant reservoir to the refrigerant circuit system of a vehicle air-conditioning system to fill the refrigerant circuit system with the refrigerant.

14. The servicing device as defined in claim 13, wherein the at least one switchover valve block enables refrigerant from the refrigerant reservoir to flow into the at least one switchover valve block and then into the flushing agent tank during the flushing of the at least one switchover valve block of the residual refrigerant/compressor oil mixture from the refrigerant circuit system.

15. The servicing device as defined in claim 14, wherein the separator is at least partially heated by compressed refrigerant from the refrigerant compressor.

16. The servicing device as defined in claim 15, including at least one dispenser selected from the group consisting of an oil dispenser and an additive dispenser, said at least one dispenser fluidly connected to the switchover valve block, the at least one switchover valve block configured to control a flow of fluid from the at least one dispenser to the refrigerant circuit system of the vehicle air-conditioning system as refrigerant flows to the refrigerant circuit system during the filling of the refrigerant circuit system.

17. The servicing device as defined in claim 16, including a weighing device to monitor a weight of the refrigerant reservoir to determine an amount of refrigerant entering or exiting the refrigerant reservoir.

18. The servicing device as defined in claim 17, wherein the flushing agent tank includes two fluid passages to enable the flushing agent tank to be used during the emptying of the refrigerant circuit system of the vehicle air-conditioning system and the filling of the refrigerant circuit system of the vehicle air-conditioning system.

19. The servicing device as defined in claim 18, including a coupler configured to be removably connected to the pressure hoses to enable fluid flow between the pressure hoses to enable residual refrigerant/compressor oil mixture from the refrigerant circuit system to be flushed from the pressure hoses during the flushing of the switchover valve block.

20. The servicing device as defined in claim 13, wherein the separator is at least partially heated by compressed refrigerant from the refrigerant compressor.

21. The servicing device as defined in claim 13, including at least one dispenser selected from the group consisting of an oil dispenser and an additive dispenser, said at least one dispenser fluidly connected to the at least one switchover valve block, the at least one switchover valve block configured to control a flow of fluid from the at least one dispenser to the refrigerant circuit system of the vehicle air-conditioning system as refrigerant flows to the refrigerant circuit system during the filling of the refrigerant circuit system.

22. The servicing device as defined in claim 13, including a weighing device to monitor a weight of the refrigerant reservoir to determine an amount of refrigerant entering or exiting the refrigerant reservoir.

23. The servicing device as defined in claim 13, wherein the flushing agent tank includes two fluid passages to enable the flushing agent tank to be used during the emptying of the refrigerant circuit system of the vehicle air-conditioning system and the filling of the refrigerant circuit system of the vehicle air-conditioning system.

24. The servicing device as defined in claim 13, including a coupler configured to be removably connected to the pressure hoses to enable fluid flow between the pressure hoses to enable residual refrigerant/compressor oil mixture from the refrigerant circuit system to be flushed from the pressure hoses during the flushing of the at least one switchover valve block.

25. A servicing device for use with vehicle air-conditioning systems to empty a refrigerant/compressor oil mixture from a refrigerant circuit system of a vehicle air-conditioning system and to fill the vehicle air-conditioning system with refrigerant and compressor oil, said servicing device comprising:

a vacuum pump for residual emptying the refrigerant circuit system, the servicing device, or combinations thereof of said refrigerant/compressor oil mixture, a refilling system for refilling the vehicle air-conditioning system with at least two components selected from the group consisting of refrigerant, compressor oil and additive, a refrigerant reservoir that is configured to be under refrigerant pressure, pressure hoses provided with servicing connection connectors configured to connect to the vehicle air-conditioning system being serviced, a separator stage comprising at least one separator, a refrigerant compressor, and a refrigerant weighing device;

at least one pressure or time controlled switchover valve block configured to selectively control a fluidic connection between the refrigerant circuit system of the vehicle air-conditioning system and the separator stage, said at least one switchover valve block in fluid communication with the separator stage, with one side of said vacuum pump and with a second side of said vacuum pump;

wherein the at least one switchover valve block includes a plurality of valves at least some of which are in a first configuration to fluidly connect the vehicle air-conditioning system to the separator during the emptying of the refrigerant/compressor oil mixture from the refrigerant circuit system of the vehicle air-conditioning system;

wherein the at least one switchover valve block includes said plurality of valves at least some of which are in a second configuration to fluidly connect the flushing agent tank to the refrigerant reservoir, the vacuum pump or combinations thereof to cause the at least one switchover valve block to be flushed out and cleaned of residual refrigerant/compressor oil mixture from the refrigerant circuit system that resides in the at least one switchover valve block; and wherein the at least one switchover valve block includes said plurality of valves at least some of which are in a third configuration to fluidly connect the refrigerant reservoir to the refrigerant circuit system of the to fill the refrigerant circuit system with the refrigerant;

an evacuatable flushing agent tank that is configured to be brought into fluidic flow connection with at least one of the servicing connection connectors via the at least one switchover valve block to enable said at least one switchover valve block to be flushed with fluid, said flushing agent tank also configured to be brought into fluidic flow communication with the refrigerant reservoir via the switchover valve block.

26. The servicing device of claim 25 wherein said switchover valve block comprises at least a first valve block and a second valve block.

* * * * *